Aug. 8, 1933.    J. S. CRAIGMYLE    1,921,283
TRAVELING CULTIVATOR
Filed April 21, 1932
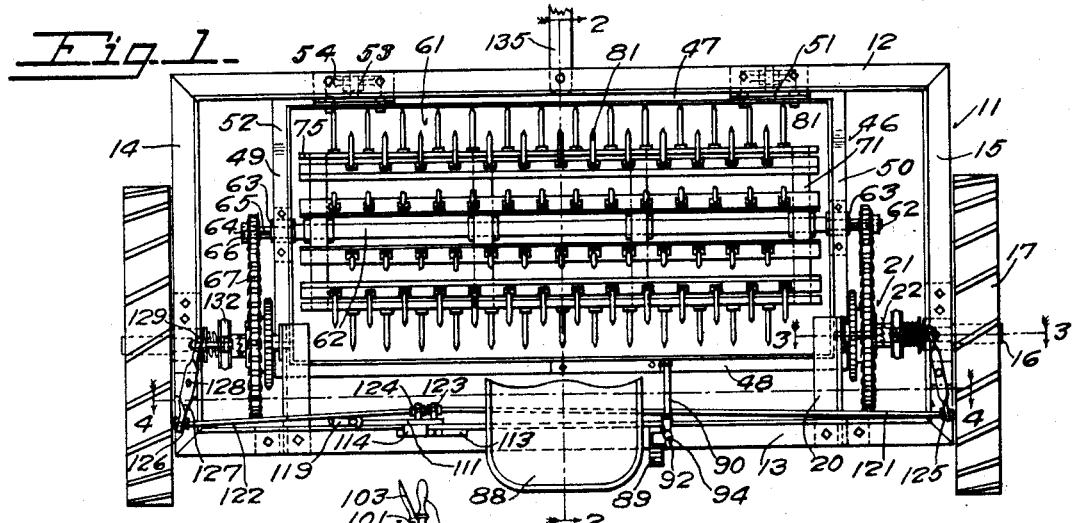
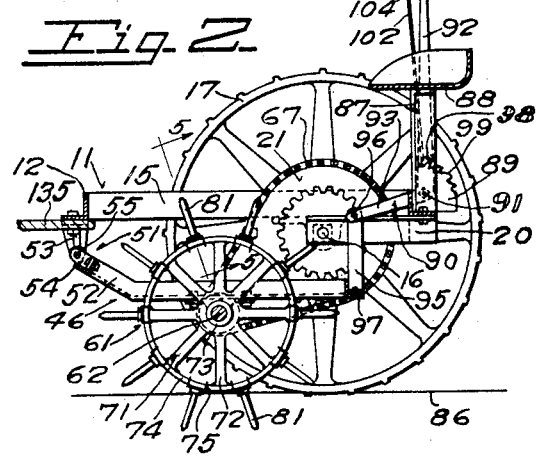
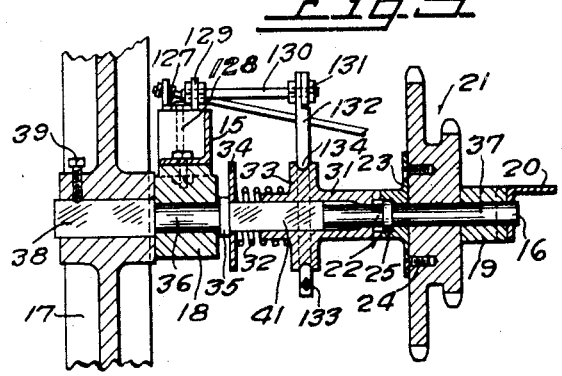
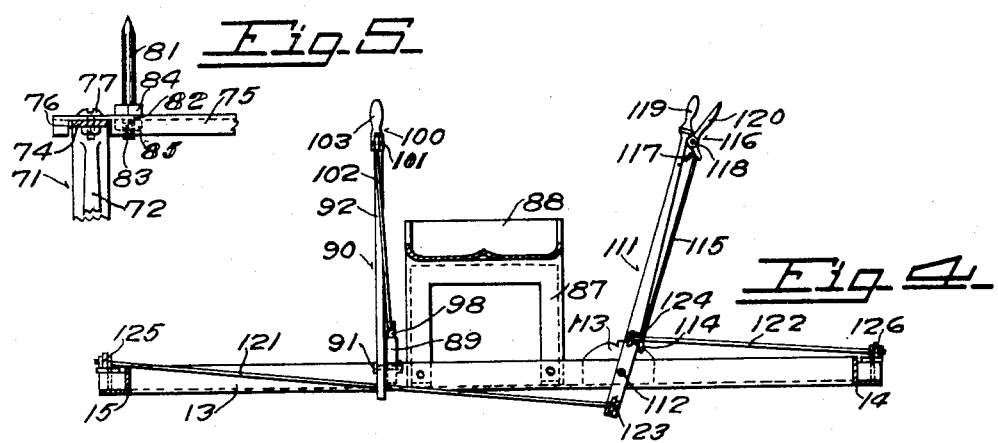
INVENTOR:
John S. Craigmyle Patented Aug. 8, 1933

1,921,283

UNITED STATES PATENT OFFICE 1,921,283

TRAVELING CULTIVATOR

John S. Craigmyle, Sparta, Ky.

Application April 21, 1932. Serial No. 606,627

1 Claim. (Cl. 97—40)

My invention relates to traveling cultivators, and it is the object of my invention to provide a novel cultivator which is arranged to be propelled over the ground to be cultivated; further, to provide thereon a rotor having fingers arranged to enter the ground, and means for adjusting the depths to which the fingers enter the ground; further, to provide a cultivator with a rotor of the character mentioned, and with means for rotating the rotor at such speed relative to the speed of travel of the cultivator as to break the surface of the ground; and, further, to provide novel means for adjusting the depths of entry of the fingers into the ground and the speed of rotation of the rotor, whereby to regulate the disturbance of the surface of the ground according to the character of service which is to be applied to the ground.

The invention will be further readily understood from the following description and claim, and from the drawing, in which latter:

Fig. 1 is a plan view of my improved device, partly broken away.

Fig. 2 is a cross-section of the same, taken on the line 2—2 of Fig. 1, and partly broken away.

Fig. 3 is an axial section of the supporting shaft for one of the tractor wheels and the parts mounted thereon, partly broken away, and taken on the line 3—3 of Fig. 1.

Fig. 4 is a cross-section, taken on the line 4—4 of Fig. 1, showing the operating levers for controlling the rotation of the rotor and its elevation, partly broken away; and, Fig. 5 is a detail sectional view of a portion of the rotor, taken on the line 5—5 of Fig. 2.

My improved device comprises a frame 11, shown as a rectangular frame made of angle irons and having crossbars 12, 13 and end bars 14, 15, rigidly secured together. An axle 16 is at each end of this frame and has a traction wheel 17 thereon. Each of the axles is journaled in a bearing 18 fixed to the lower side of the end bar of the frame. The inner end of the axle is journaled in a bearing 19 fixed to a bracket 20, which in turn is fixed to the rear bar of the frame and extends forwardly.

The inner end of each axle carries a sprocket wheel 21 normally rotatively loose thereon, and comprising a pair of sprocket wheel sections of different diameters. There is a clutch 22 between the axle and the sprocket wheel, shown as a tooth clutch, one hub 23 of which is fixed to the sprocket wheel, as by screws 24. This hub and the sprocket wheel are held endwise on the axle by a collar 25, the hub and sprocket wheel being held between said collar and the bearing 19.

The other member of the clutch is on a sleeve 31 which is shiftable endwise on the axle for engaging and disengaging the clutch. This sleeve is normally urged toward the coacting member of the clutch by a spring 32 received about the sleeve between a flange 33 on the sleeve and a washer 34 about the axle, a flange 35 being located between the washer and the bearing 18.

The axle rotates on journal sections 36, 37, thereof in the bearings 18, 19. The section 38 thereof in the traction wheel is preferably square in cross-section in a similarly shaped bore in the hub of the traction wheel for fixing the traction wheel and the shaft so as to rotate together, a set bolt 39 fixing the parts in endwise relation.

The axle also has a section 41 which is square in cross-section received in a correspondingly square bore in the sleeve 31 for insuring rotation of the sleeve with the axle. The inner clutch end of the sleeve has a round bore in which the round inner portion of the axle is located, the latter portion of the axle extending inwardly through the clutch hub 23, the sprocket wheel and the bearing 19.

An auxiliary frame 46 is mounted on the main frame. This auxiliary frame comprises front and rear cross-bars 47, 48, and end bars 49, 50, rigidly secured together. These bars are preferably formed of angle irons. Hinges 51 are located between the front bar of the main frame and the front bar of the auxiliary frame. The end bars of the auxiliary frame are preferably provided with forwardly and upwardly extending portions 52, for elevating the front bar of the auxiliary frame and locating it more nearly on a level with the front bar of the main frame, as shown in Fig. 2. The hinges respectively comprise a depending butt 53 depending from and fixed to the front bar of the main frame and a butt 54 slanting forwardly and upwardly from and fixed to the front bar of the auxiliary frame, the pintle 55 of the hinge pivoting said butts together.

A rotor 61 is journaled on the auxiliary frame and comprises a shaft 62 journaled at its respective ends in bearings 63 fixed to the lower faces of the respective end bars 49, 50, of the auxiliary frame. A sprocket wheel 64 is received about the shaft at each end thereof, being preferably slidable on said shaft but rotatively held thereto, as by spline groove and key connection 65. This sprocket wheel slides endwise on the shaft between the bearing 63 and a collar 66 fixed to the shaft at each end thereof.

A sprocket chain 67 is received about this sprocket wheel and one of the sprocket wheel sections of the sprocket wheel 21, the sprocket chain being preferably so arranged that it may be readily lengthened or shortened to accommodate itself to the length of loop about the respective sprocket wheels of different diameters.

The rotor comprises spiders 71, four of which are exemplified about the shaft, these spiders being respectively fixed to the shaft so as to rotate therewith. Each of the spiders comprises spokes 72, extending outwardly from hub 73 of the spider, and a rim 74 about the outer ends of the spokes. Channel bars 75 are at the outer peripheries of the rotor and are respectively fixed to the various spiders. The channel bars are preferably provided with slots 76 at the respective spiders, the wings of the channel bars extending inwardly and the webs of the channel bars being fixed to the rims of the spiders (see Fig. 5). The slots are shown in the wings of the channel bars. The spiders may be fixed to the rims by a screw and nut connection 77, or the parts may be welded together for forming a fixed structure.

Fingers 81 extend outwardly from the rotor. These fingers are shown secured to the channel bars, as by providing the webs of the channel bars with holes 82 in which threaded ends 83 of the fingers are located. Each of the fingers is provided with a nut 84 threaded over its threaded end and resting upon the outer face of the channel bar for forming a shoulder locating the finger radially. A nut 85 is threaded over the threaded end 83 in the channel of the channel bar and clamps the finger to the channel bar.

The fingers are readily released by unscrewing the latter nut for attention to or substitution of fingers. The fingers on the respective bars are spaced apart, and the fingers on neighboring bars are preferably located in staggered relation, so that the fingers on the respective bars operate in the spaces between the fingers of neighboring bars (see Fig. 1).

Means are provided for raising and lowering the rotor in order that its fingers may enter the ground, the surface of which is indicated by the line 86, to greater or less extent below its surface. The vehicle is provided with an operator's seat 88 on a standard 87. At one side of the operator's seat a bracket 89 is fixed to the rear bar 13. An operating lever 90 is pivoted to this bracket on a bolt 91. This lever has an upwardly extending arm 92 and a forwardly extending arm 93. The upwardly extending arm has a handle 94 within convenient reach of the operator, for instance, the right hand of the operator.

A link 95 is pivoted to the forwardly extending arm of the angle lever by a pivot 96, and is loosely fixed to the rear bar of the auxiliary frame by a connection 97. The operating lever has a pawl 98 pivoted thereto arranged to engage the respective teeth of a segment rack 99 formed on the bracket 89 fixed to the rear bar of the main frame.

A bell crank lever 100 is pivoted to the lever 90 at 101, a link 102 extending between the bell crank lever and the pawl for releasing the pawl from the ratchet rack when the handle 103 is moved toward the handle 94 by the hand of the operator grasping the two, so that the operator may shift the operating lever for adjusting the elevation of the rotor and holding the rotor in adjusted position by release of the handle 103. The pawl is normally urged into engaging relation with the teeth of its rack by a spring 104. Upon rearward movement of the arm 92 for raising the rotor, the pawl may automatically retract and reengage teeth of the ratchet rack without manipulation of the handle 103.

At the other side of the seat of the operator there is an operating lever 111 pivoted to the rear bar 13 of the main frame on a pivot 112. A ratchet rack 113 is fixed to this rear bar and has teeth thereon which are engaged by a pawl 114 pivoted to the operating lever 111 and having articulated connection by means of a link 115 with the bell crank lever 116, the link end of which is normally urged toward the operating handle by a spring 117. The bell crank lever is pivoted to the operating lever on a pivot 118 in adjacency to the handle 119, and has a handle 120 in adjacency to the handle 119, so that the operator may grasp both handles for manipulating the operating lever 111 and releasing the pawl and permitting reengagement of the pawl with its proper tooth of the ratchet rack 113 when the operating handle has been properly adjusted.

The operating lever 111 serves the purpose of engaged relation or release relation in the clutches 22. Links 121, 122, have pivotal connections 123, 124 with the operating lever at the respective sides of its pivot 112. The other ends of the links have pivotal connections 125, 126, with one of the ends of levers 127, pivoted at 128 to the respective end bars of the main frame.

The other ends of these levers have pivotal connections 129 with links 130, which in turn have rigid connections 131 with straps 132 at the respective sides of the flange 33 of the sleeve 31. The lower ends of the straps are connected by a bolt and nut connection 133.

The straps form a loop or fork received in an annular groove 134 in the flange 33 for moving said flange and sleeve endwise by the operation of the operating lever 111. The pivotal connections between the operating lever and the links and the pivotal connections between the links and the levers 127, are preferably formed by suitable nuts received over threaded ends of the links at the respective sides of lugs on the coacting parts for limiting endwise movements of the links, the connections being sufficiently loose for accommodating pivotal movements of the levers.

When the operating lever 111 is moved in one direction, for instance toward the operator's seat, the clutches 22 are disengaged, permitting idle rotations of the traction wheels with relation to the rotor, and when this operating lever is moved in the opposite direction, for instance, away from the operator's seat, the clutches are permitted to engage for rotation of the rotor by the traction wheels. The springs 32 act to normally urge engaging relations in the clutches.

The main frame is suitably propelled, as by being dragged by means of a draw bar 135 suitably connected with the main frame. Draft animals or a tractive or other motive power for causing travel of the cultivator across the ground may be suitably connected with the draw bar.

My improved device is applicable in a number of relations, in harrowing, raking and cultivating the ground. If it is desired to harrow the ground or cause deep cultivation of the same, the rotor is lowered by manipulation of the operating lever 90 for causing the teeth 81 to enter the ground to substantially their entire length. The speed of the rotor may also be adjusted for more or less rapid rotation of its outer periphery with relation to its speed of travel over the ground. It may be instanced that the teeth have a length of five or six inches and that the outer periphery of the rotor has a speed of two and one-half to four times the speed of the outer periphery of the traction wheels. These are instanced as examples, but not as limitations, as it is obvious that the proportions may be varied without departing from the spirit of my invention set forth in the appended claim.

More rapid rotation of the rotor causes more forceful thrust of the ground disturbed by the fingers, and greater depth of sinking of the fingers into the ground causes disturbance of the ground to a greater depth. The machine may therefore be regulated for the various duties which it is to perform.

The insertion of the teeth into the ground in spaced relations from each other, as well as in staggered relations between the rows of teeth, permits the insertion of the teeth into the ground and the breaking of the crust in such manner that harmful disturbance of the seeds and small plants is avoided, as the ground is broken up into small particles which do not carry the seeds and plant with them to detrimental extent when passing over the ground.

My improved device has been found of great benefit in harrowing and in raking ground in which seed, for instance corn or soy beans, and other seeds, are to be sown broadcast, and in cultivating ground in which seeds have been so sown, and in which the plants are growing.

My improved device is also applicable in cultivating ground after plowing for preparing the same for seed, is an excellent means for pulverizing the surface of the ground to prevent hardening the same after rains, and for breaking the crust of ground to prevent evaporation of the moisture therein before and after the seeds have been sown therein, as well as after propagation of the seeds has begun, and the plants are growing.

The operation of the machine is further very convenient, as the operating handles are at the respective sides of the operator's seat, close to the respective hands of the operator. The traction wheels are also independent of each other, and the ends of the rotor may be disconnected from the respective traction wheels, providing for ready change of the course of the vehicle without strain on the parts, and permitting severance of power from the rotor, so as to permit the rotor to rotate idly upon the ground and also permitting the rotor to be raised above the ground for ready movement of the apparatus from place to place.

The fingers are readily removable for sharpening or other attention to the same, and for replacement of the same in case of injury, and the rotor is built up of few parts, cheaply constructed and readily assembled.

Having thus fully described my invention, what I claim as new, and desire to secure by Letters Patent, is:

In a machine of the character described, the combination of a main frame comprising a front bar, a rear bar, end bars and a forwardly extending bracket on said rear bar adjacent each end thereof between said end bars forming a gear and clutch receiving space at each end of said main frame, an independent axle at each end of said main frame at the rear portion thereof, said axles journaled on said respective end bars and said respective brackets adjacent thereto, a traction wheel fixed to each of said axles outside said end bars, a sprocket-wheel and a clutch therefor about each of said axles in said respective spaces, a rotor frame comprising a front bar, a rear bar and end bars, the front bars of said respective frames hinged together, a shaft journaled on said rotor frame, a rotor secured on said shaft, said rotor provided with fingers arranged to enter the ground, a sprocket-wheel at each end of said shaft, a pair of sprocket-chains respectively looped direct about said respective first-named sprocket-wheels and said respective second-named sprocket-wheels, and means between the rear portions of said frames for adjusting the elevation of said rotor, and arranged whereby to drive said rotor by a single pair of sprocket-chains looped direct about the axes of rotation of said traction wheels and said rotor.

JOHN S. CRAIGMYLE.